(12) United States Patent
Hansen

(10) Patent No.: US 6,990,825 B2
(45) Date of Patent: Jan. 31, 2006

(54) VENTILATING DEVICE AND A BUILDING COMPRISING SUCH A VENTILATING DEVICE

(75) Inventor: Ole Hansen, Humlebæk (DK)

(73) Assignee: Danfoss A/S, Nordborg (DK)

( * ) Notice: Subject to any disclaimer, the term of this patent is extended or adjusted under 35 U.S.C. 154(b) by 120 days.

(21) Appl. No.: 10/332,228

(22) PCT Filed: Jul. 6, 2001

(86) PCT No.: PCT/DK01/00476

§ 371 (c)(1),
(2), (4) Date: Apr. 7, 2003

(87) PCT Pub. No.: WO02/04871

PCT Pub. Date: Jan. 17, 2002

(65) Prior Publication Data

US 2003/0159803 A1    Aug. 28, 2003

(30) Foreign Application Priority Data

Jul. 7, 2000  (DK) .............. 2000 01062
Sep. 4, 2000  (DK) .............. 2000 01314
May 4, 2001   (DK) .............. 2001 00703

(51) Int. Cl.
*F25D 21/14* (2006.01)

(52) U.S. Cl. ....................................... 62/285
(58) Field of Classification Search .......... 62/262, 62/285, 259.1; 454/246, 288
See application file for complete search history.

(56) References Cited

U.S. PATENT DOCUMENTS

| | | |
|---|---|---|
| 3,074,477 A | 1/1963 | Whalen |
| 4,126,268 A | 11/1978 | Vitale |
| 4,511,786 A | 4/1985 | Jansen ................ 219/364 |
| 4,523,081 A | 6/1985 | Geib, Sr. et al. ...... 219/370 |
| 4,733,542 A | 3/1988 | Blair |
| 4,754,697 A | 7/1988 | Asselbergs ............ 98/103 |
| 4,951,737 A | 8/1990 | Tenhundfeld et al. .... 165/1 |
| 5,056,087 A | 10/1991 | Ferguson ............. 370/84 |

(Continued)

FOREIGN PATENT DOCUMENTS

| | | |
|---|---|---|
| DE | 42 15 335 A1 | 11/1993 |
| DE | 4215335 A1 | 11/1993 |
| EP | 0769660 | 4/1997 |
| JP | 2-130330 | 5/1990 |

(Continued)

OTHER PUBLICATIONS

Search Report.

*Primary Examiner*—Melvin Jones
(74) *Attorney, Agent, or Firm*—Buchanan Ingersoll PC

(57) ABSTRACT

A ventilating device (1) comprises one or more impellers (2) extending in a longitudinal direction around an axis of rotation. Each of the impellers (2) is adapted to suck air from an ambient atmosphere in a transverse direction over a substantial part of the impeller's length. A coupling for transmitting a driving force from one impeller to another is disclosed. The ventilating device may be comprised in a unit with a cover (6) and a chassis, and it may be mounted to or around a heating or cooling pipe (3; 4) in a room of a building. A holding member (5) which may be connected to the cover (6) holds the pipe or pipes (3; 4) and/or one or more impellers (2). The device is easy to mount and may have improved energy efficiency. A building with a ventilating device, a method of operating the ventilating device, a system comprising a plurality of ventilating devices, and a mounting member for one or more pipes and/or one or more impellers are further provided.

96 Claims, 8 Drawing Sheets

U.S. PATENT DOCUMENTS

| | | | |
|---|---|---|---|
| 5,094,596 A | 3/1992 | Erwin et al. | 417/397 |
| 5,181,884 A | 1/1993 | Ducharme | 454/246 |
| 5,263,796 A * | 11/1993 | de Waal | 405/172 |
| 5,669,229 A | 9/1997 | Ohbayashi et al. | 62/259.1 |
| 5,790,748 A | 8/1998 | Tamhane | 392/366 |
| 5,870,420 A | 2/1999 | Webb | 372/58 |

FOREIGN PATENT DOCUMENTS

| | | |
|---|---|---|
| JP | 2130330 | 5/1990 |
| JP | 10-9602 | 1/1998 |
| JP | 10009602 | 1/1998 |
| WO | 9010180 | 9/1990 |
| WO | 9746834 | 12/1997 |

* cited by examiner

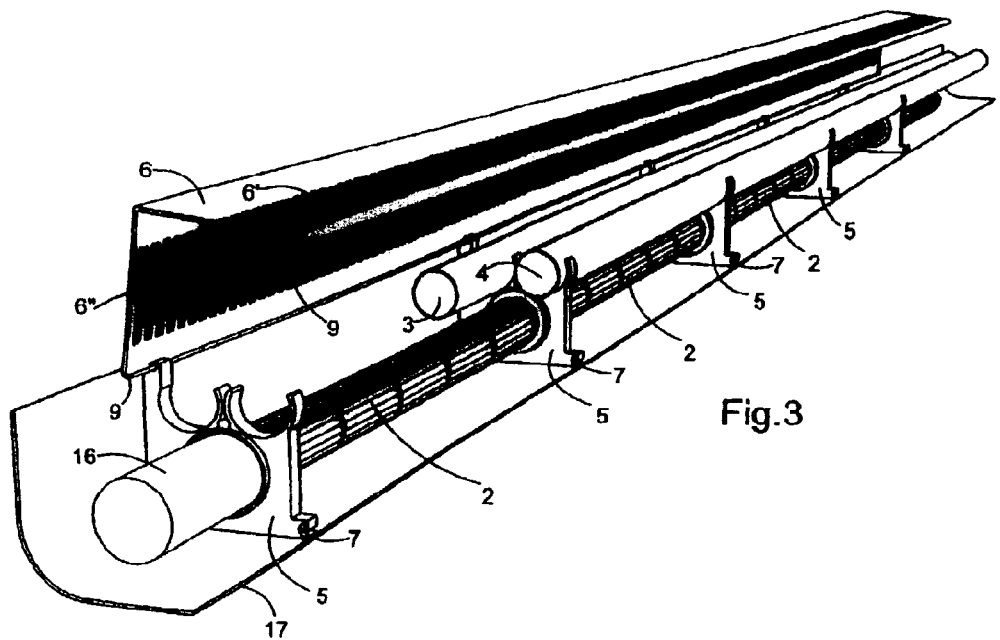
Fig.3
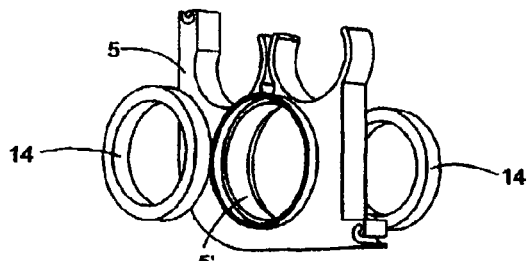
Fig.4
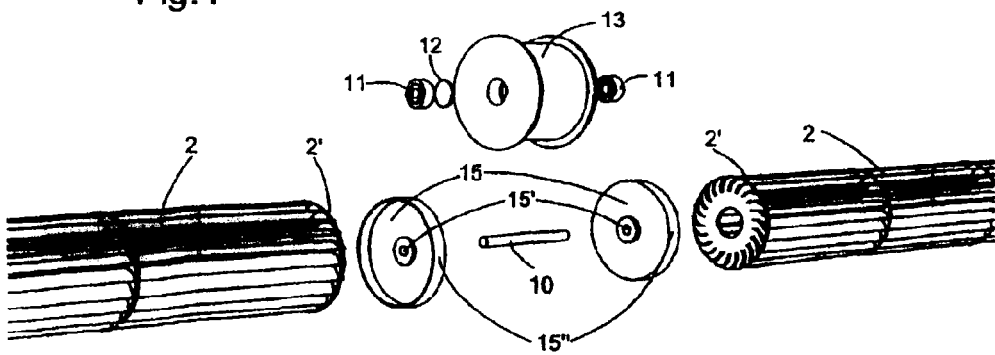

VENTILATING DEVICE AND A BUILDING COMPRISING SUCH A VENTILATING DEVICE

TECHNICAL FIELD

The present invention relates to a ventilating device comprising a plurality of cross-flow impellers and to a building comprising such a ventilating device. The ventilating device is particularly applicable as a heat exchanger for use in an indoor heating or a cooling system. The invention also relates to a method of operating a ventilating device. The invention further relates to a holding member which is suitable for use in a ventilating device according to the invention.

BACKGROUND OF THE INVENTION

The prior art has proposed various ventilating devices or heat exchangers having cross-flow impellers for local forced air heating.

U.S. Pat. No. 4,126,268 discloses a portable room-temperature controller unit having a housing provided with an air driving element arranged between an air inlet and an air outlet, the air outlet feeding the forced air beneath a fixed room ventilating device, e.g., baseboard or convector heater with which the unit is designed to operate. In one embodiment, the unit has a motor driven fan which is controlled by a pair of thermostats. In operation, the unit is placed below a ventilating device, and air is drawn into the unit by the fan and forced along a duct and directed by baffles or guide members into a projection and out of an outlet upwardly through the ventilating device. The ventilating device is open along its underside, and heat emerges through louvers along an upper front portion. In another embodiment, the unit housing has an enlarged central portion with air ducts extending on either side. A projection, running the length of the housing, extends beneath a radiator and is provided with a series of upwardly facing slotted openings, positioned transverse to the length of the unit and coextensive therewith. The central portion houses a motor which is the driving element of a transverse flow blower having blades extending on either side of the motor.

U.S. Pat. No. 4,754,697 discloses a portable fan device which is usable both as a cooling fan for circulating ambient air and as a device for increasing the flow of air through a register. The device comprises a housing containing both a fan impeller and an electric motor for driving the impeller, the housing having a skirt surrounding a bottom air inlet. The stator part of a conventional electric motor is mounted on a mounting plate. The rotor shaft of the motor has an end projecting into a flexible coupling which is also fixed to the end of a tangential fan impeller.

Further devices are known from U.S. Pat. Nos. 5,181,884 and 4,511,786.

DESCRIPTION OF THE INVENTION

It is an object of the invention to provide a ventilating device, the extent of which can be easily adapted to the space available therefor. It is a further object of the invention to provide a ventilating device which can be easily installed in new as well as existing buildings while allowing for individual control of the temperature of the rooms of the building. It is a still further object to provide a ventilating device which is capable of utilising the space available in a room to a maximum degree. It is a further object to provide a ventilating device which generates only as little aerodynamic noise as possible. It is a further object to provide a ventilating device for a building which is easy and cheap to manufacture and install. It is a further object of the invention to provide a ventilating device which can be used as a heat exchanger and which can easily be mounted to cooling or heating pipes of a building.

Thus, in a first aspect, the present invention provides a ventilating device comprising:

at least two impellers extending in a longitudinal direction around an axis of rotation, each of the impellers being adapted to suck air from an ambient atmosphere in a transverse direction over a substantial part of the impeller's length, a motor, which is preferably electrically driven, connected to the impellers, so as to cause rotation of the impellers around said axis, at least one holding member at each end of each of the impellers for holding the impellers, a cover for covering the holder and the impellers, and having openings formed therein, so as to allow a flow of air into and out of the impellers, the cover comprising a connector for connecting the cover to the holding member, wherein the holding member is adapted to cooperate with the connector of the cover, so as to connect or fix the cover to the holding member.

The holding member may be adapted to releasably connect or fix the cover to the holding member, or the holding member may alternatively be secured to the cover. The connector may comprise one part or an assembly of a plurality of parts for connecting or fixing the holding member to the cover.

Accordingly, a unit is provided in which the impellers, the cover, optionally a chassis and optionally one or more pipes containing a heating or cooling fluid are integrated. This has the advantageous effect that the ventilating device is easy to install, e.g., in existing buildings. Moreover, the impellers may be mounted in such a way that they are easy to remove, e.g., for cleaning purposes. In a preferred embodiment of the invention, no channels or pipes are needed for conveying the air flow emerging from the impellers to the cover outlet which confers reduced pressure drop and thus reduced power consumption as well as a reduced aerodynamic noise level. Moreover, due to the integrated nature of the device, the weight of the device may be very low thereby facilitating installation of the device.

Each of the impellers preferably have blades extending along substantially the entire length of the impeller. Each impeller is preferably adapted to suck air into the impeller in a first transverse direction and to blow air out of the impeller in a second transverse direction which may, e.g., be perpendicular to the first transverse direction. The motor may be connected to a series of impellers at one end of a series of impellers, in which case the impellers may be mutually interconnected by a coupling or force transmission assembly, so that rotation of the motor may cause rotation of a plurality of impellers. Alternatively, the motor may be arranged between two impellers, in which case each of the two impellers may be connected to further impellers or mounted to other impellers. The motor may comprise any conventional and commercially available electrically driven motor producing an appropriate power at an appropriate rate of revolution.

The device may be adapted to be mounted to a pipe containing a heating or a cooling fluid and to hold the impellers and the pipe in fixed positions in relation to each other, the impellers and the cover being adapted to cause a substantial part of the flow of air emerging from the impellers to flow in a transverse direction along the outer surface of the pipe and back to the ambient atmosphere. If the device is adapted to hold two pipes, e.g. a supply pipe and a return pipe, the device is preferably adapted to cause 40–60% of the air flow emerging from the impellers to flow around one of the pipes and the rest of the flow to flow around the other pipe.

The pipe or pipes may be held by the holding member, or they may be held by a separate frame or pipe clip. The separate frame or pipe clip may be connected to the holding member in a secured or a releasable manner.

The pipe containing fluid may be a hot water pipe, a steam pipe or a hot air duct connected to or being part of a source of hot water or air or steam, e.g., a district heating source or a central heating source connected to or comprised in a building. The fluid may comprise water, steam or air or any other suitable medium. On its outer surface the pipe may be provided with fins or ribs for improving heat transmission.

In case the ventilating device is used for cooling purposes and a pipe containing a cooling fluid, an absorption layer or pad may be provided for absorbing condense water. The absorption layer or pad may be provided in a drip tray comprised in the device. A drip tray is in particular useful in case the pipes extend in a non-horizontal direction. The absorption layer may be made from a cloth of an inorganic material, such as from cellulose fibres. The layer is preferably adapted to distribute condense water droplets over the entire area of the layer. As an alternative to the absorption layer, or in addition to the absorption layer, a draining pipe for leading away condense water may be provided. The draining pipe may comprise one or more openings for letting condense water into the pipe, such as for example a longitudinally extending slot at the top of the pipe. The draining pipe may be mounted to or held by the holding member, or it may be mounted to or be an integrated part of the cover. Suction may be provided in the draining pipe in order to actively suck condense water from absorption layer or pad and/or the drip tray.

The holding member may be made from steel or any other metal, such as Aluminium or a coated Aluminium, or from a plastic material and may be adapted to be securely fixed in relation to, e.g., a wall or a floor of a building. It may comprise bores or grooves for the pipe and/or for bearings for the impellers. The holding member is preferably designed such that it can easily be detached from the impellers and/or the pipe, including any possible optional return pipe for the fluid. A groove for holding a pipe or a bearing for an impeller may be built as a resilient clip surrounding the pipe or impeller bearing over a part of its periphery only. Alternatively, or additionally, the holding member may be provided with a through-going bore or hole for receiving and holding the impeller bearing or pipe. The holding member may be adapted to hold one impeller only, or it may be adapted to hold two impellers in an end-to-end fashion. Preferably, each impeller is supported by a holding member at each of its ends. Each holding member may be adapted to be fitted into a transition between two walls of a room or into a transition between wall and floor, or wall and ceiling. A chassis may be provided, the holding members being mounted or connected to the chassis.

The heat transfer may be relatively high in view of the noise generated by the device as compared to prior art devices. In a typical application of the ventilating device, when used as a heat exchanger, the heat exchange is 200–400 Watt per meter, such as approximately 300 Watt per meter, at an impeller speed of 1000–2000 rpm, such as approximately 1500 rpm, and at a temperature difference between the ambient air and the fluid of 30–40° C., such as approximately 35° C., and with two pipes, such as a supply and a return flow pipe.

Preferably, the impellers and their bearings are constructed so that the mechanical and aerodynamic noise generated by the impellers and their bearings is not detectable by the human ear at a distance of 1 meter from the device, i.e. the noise being less than 20 dB(A). If a higher noise level is acceptable, e.g., in an office building where approximately twice as much noise as the aforementioned noise level is acceptable due to noise generated by ventilators of, e.g., computers, the transmitted effect may be as high as 400–800 Watt per meter, such as approximately 600 Watt per meter under the above-mentioned circumstances.

The cover may be made from metal, such as Aluminium, steel or a steel alloy, or it may be made from a plastics material. The cover preferably comprises one or more openings for allowing air entering and leaving the impellers to pass therethrough. The openings may be made as louvers. The cover may be adapted to be fixed or detachably mounted to a wall or a floor of a building, or it may be adapted to be fixed or detachably mounted or connected, e.g. pivotally connected, to the holding members. The cover may be formed as a plate with 90° bend extending along its entire length. It may be provided with a projection or a collar portion for engaging with one or more corresponding grooves in the holding members. The cover may have two sets of openings, one set being provided at one surface of the cover and allowing air to enter the impellers in the first transverse direction, and another set provided at another surface and allowing air to escape or emerge from the impellers in the second transverse direction. In case the longitudinal extent of the ventilating device is greater than the length of cover available, a plurality of covers may be arranged in a series.

It will be appreciated that while the ventilating device is easy to assemble and install as well in new buildings as in existing buildings, the length of the ventilating device can easily be varied by varying the number of impellers and holding members and adjusting the length of the cover accordingly. Due to the integration of pipe and impeller by means of the holding member, the invention allows for a compact design, while the ventilating device is not dependent on the presence of other exterior devices than the pipe connected to a cooling or heating source. Thus, the ventilating device according to the invention is flexible and easy to handle.

The pipe preferably constitutes a supply pipe for the fluid. The ventilating device may in addition to the pipe, or supply pipe, comprise a return pipe for the fluid, in which case the device may be adapted to hold the return pipe in relation to the impellers and the supply pipe. The holding member may hold the return pipe in a fixed position in relation to the impellers and the supply pipe. The pipe or the supply pipe may comprise a finned pipe. Preferably, the impeller and the cover as well as any baffles or guide members included in the ventilating device are designed in such a way as to cause a major part of the flow emerging from the impeller, and preferably the entire flow, to flow past the supply pipe. A longitudinally extending baffle for guiding the flow is preferably mounted to the inner side of the cover. The baffle or guide member is preferably designed so as to minimise aerodynamic noise and may be coated with or made from a heat insulating material. The baffle or guide member may be a separate element, or alternatively an integrated part of the cover. In case the baffle or guide member is a separate element, it may be adapted to be mounted on the pipe or pipes, e.g., by a clip-on mechanism. In case the baffle or guide member is integral with the cover, the cover and baffle/guide may be made in one piece, e.g., by moulding or extruding, or from a plastics material.

For heating purposes, the supply pipe may be at a higher temperature than the temperature of the ambient air, whereas for cooling purposes the fluid in the supply pipe may be at a lower temperature than the temperature of the ambient air. The cover may, preferably on its inner surface facing the pipe and the impeller, be coated or provided with a heat insulating material, so as to minimise the rate of heat exchange between the pipe(s) and the ambient air when the impeller is not operating.

A plurality of impellers may be mounted on a common shaft in a series with the motor arranged at one end of the series. Alternatively, the motor may be arranged between two of the impellers in the series. More than one motor may be provided in the ventilating device.

Each of the holding members preferably comprises a bearing arrangement for the impeller or impellers being held by the bearing arrangement. The bearing may comprise ball or roller bearings, including needle bearings, sleeve bearings or journal bearing. Preferably, a bearing block abutting the outer surface of the ball or roller bearings is provided, the bearing block being fitted into a bore or groove in the holding member. The bearing block is preferably made from a heavy and cheap material, such as a metal, such as steel, zinc or brass, and may serve to dampen vibrations. The bearing may be adapted to dampen vibrations of the impellers, so as to dampen mechanical noise generated by the impellers and associated moving parts, and/or so as to extent the life time of moving parts. In order to dampen vibrations, a resilient ring may be fitted between the bearing block and a bore or groove in the holding member.

In order to transmit rotation from one impeller to another, a collar member may be provided, the collar member having, at one side, a collar portion into which an end portion of an impeller is fitted. The collar member may be mounted on one end of a shaft extending through the bearing. At the other end of the shaft, a further collar member may be mounted, which collar member is in engagement with a further impeller. Preferably the collar portion of the collar member is in engagement with a ring-shaped member provided on the outer periphery at the impellers at their respective ends. Rotation may be transmitted from one impeller to another by means of the two impellers' respective collar members and the shaft onto which both collar members are mounted. The collar member may further be adapted to dampen vibrations. Preferably, the collar member is made from a resilient material. This makes it possible to easily remove the impellers, e.g., for leaning purposes.

Preferably, the resilient ring is made from a material which is softer than the material from which the resilient collar member is made. The resilient rings may be made from a soft rubber material, such as poron. The collar member may be made from a harder rubber material, such as silicon, or from plastic, such as from polyethylene which may be formed, e.g., by injection moulding.

In order to control the rate of heat exchanged by the ventilating device and thereby to control the temperature of, e.g., a room in which the ventilating device is installed, a thermostat for metering the ambient temperature and for controlling the speed of rotation of the impellers in response to the ambient temperature may be provided.

In a second aspect, the invention relates to a ventilating device comprising:
at least two impellers extending in a longitudinal direction around an axis of rotation, each of the impellers being adapted to suck air from an ambient atmosphere in a transverse direction over a substantial part of the impeller's length,
a motor, preferably an electrically driven motor, connected to at least a first one of the impellers, so as to cause rotation of the impellers around said axis,
at least one coupling or force transmitting assembly for transmitting a driving force from said first impeller to a second one of the impellers.

Thus, only one motor is applied for driving a plurality of impellers, thereby reducing the number of motors needed in an application of the ventilating device, as only one motor is required for driving two, three, four, five, six or more impellers, such as seven, eight, nine, ten or more than ten impellers, and as power supply for one one motor only is needed. Thereby, the costs involved in manufacturing, installing and running the device may be lower than if more motors were needed, and installation of the device may be facilitated. Further, the flow of air into and out of the device may be evenly distributed over the length of the device, as the entire length or nearly the entire length of the device may be occupied by impellers.

The motor may be provided at one end of the first impeller, and the coupling may be provided at an end of the impeller which is opposite to the end to which the motor is connected. Thus, a driving force is applied to the first impeller at one end thereof, the driving force being transmitted from the first impeller to the second impeller at the opposite end of the first impeller. The coupling may be made so that it comprises one or more parts which engages the outer periphery of the first and/or second impeller and which transmits a driving force from the first impeller to the second impeller. Additionally or alternatively, the coupling may comprise a shaft interconnecting the first and the second impeller, or it may comprise a friction coupling such as, e.g. a coupling wherein a disc at one end of the first impeller is in forced frictional engagement with another disc at an end of the second impeller, or a coupling wherein the two impellers have parts which are in forced mutual engagement by electromagnetic forces.

As described above in connection with the device according to the first aspect of the invention, the coupling may comprise a collar member having a collar portion into which an end portion of a first impeller is filled. The collar member may be mounted on one end of a shaft extending through a bearing, and a further collar member may be provided at the other end of the shaft, which further collar member is in engagement with a second impeller, so as to transmit rotation from one impeller to another.

At least one holding member may be provided at each end of each of the impellers for holding the impellers. The device may further comprise a cover for covering the holding members and the impellers, the cover having openings formed therein, so as to allow a flow of air into and out of the impellers.

It should be understood that any and all features, parts, characteristics and functionalities described above in connection with the device of the first aspect of the invention may also be incorporated in the device according to the second aspect of the invention.

In a third aspect, the invention relates to a method of operating a ventilating device according to the invention and having or being mounted to a heating or cooling pipe, the method comprising counteracting heat transmission due to natural convention by operating the impellers in such a way as to achieve convection opposite to the natural convection. Such a method may applied in case no heat transmission is desired. As natural convection is usually conferred by the pipe containing the heating or the cooling fluid, a certain amount of heat is transmitted due to natural convection, i.e. convection not conferred by a flow of air emerging from the impellers. Such natural convection may be counteracted or eliminated by operating the impellers so as to achieve convection opposite to the natural convection.

In all aspects of the present invention, the impellers may be electronically controlled and operationally connected, e.g., to a thermometer. The rotational speed of the impellers may be controlled in a discrete or a continuous way. The control system for controlling the rotational speed of the impellers may be a commercially available system known per se, such as a pulse wide modulating (pwm) control system.

In a further aspect, the invention relates to a building comprising a plurality of rooms and at least one ventilating device according to the first aspect of the invention, and optionally at least on pipe containing a heating or cooling fluid, wherein the pipe extends between at least two rooms. Preferably, a motor and a thermostat is provided in each room, each thermostat being adapted to control the speed of rotation of the associated motor, so as to individually control the temperature in each of the rooms. The cover may be interrupted at the transition at a wall or a horizontal division between two rooms.

The pipe may extend between two rooms at the some level, or it may extend in an upright direction, e.g., between two rooms at two different levels. Likewise, one motor may drive a plurality of impellers in a plurality or rooms, whereby the impellers in the two or more rooms are interconnected by means of the coupling mentioned above in connection with the first and second aspects of the invention.

A beneficial effect of the device and the building according to the invention is that no valves for controlling a flow of heating or cooling fluid is necessary. This reduces flow resistance in the pipes, thereby reducing the amount of power needed for conveying the fluid through the pipe or pipes. Moreover, no independent control of the flow of the heating or cooling fluid to different rooms of the building is necessary.

In case the device is used as a cooling device, the pipe containing the cooling fluid may extend 2–10 meters into the ground, thereby conferring a temperature of the cooling fluid, e.g., water, of approximately 10–12° C.

The invention further relates to a mounting member for holding at least one pipe in a fixed position, the pipe extending in a longitudinal direction, and the mounting member being adapted to fix the pipe in a transverse direction in relation to the mounting member and to releasably fix the pipe in relation to the mounting member. The mounting member has an open face through which the pipe can be inserted into the mounting member in the transverse direction by relative movement between the mounting member and the pipe. The mounting member may be adapted to hold at least two pipes in a fixed position.

When mounted in the mounting member the two pipes may be arranged along a straight line extending in the transverse direction, the mounting member preferably having an open face at one end of the straight line through which the pipes may be inserted into the mounting member.

The mounting member may be adapted to be brought into engagement with the pipe or pipes by clipping. The mounting member may further be adapted to hold an impeller in fixed relation to the pipe or pipes, e.g. a bore extending through the mounting member for holding the impeller. The mounting member may be comprised in a ventilating device according to the first and second aspect of the invention.

In a further aspect, the invention relates to a building comprising:
  at least two rooms,
  a heating or cooling pipe extending from a first one of the rooms to a second one of the rooms,
  a ventilating device being arranged in each room in the vicinity of said pipe, the ventilating device being adapted to cause a flow of air across the pipe,
  a control system for controlling operation of each of the ventilating devices, so as to vary the rate of heat transfer from the pipe to its surroundings by variation of the air flow rate of said airflow.

Thus the heating or cooling pipe may extend between a plurality of rooms without the need for valves for controlling the flow rate of heating or cooling fluid in the pipe. The temperature in the rooms may for example be varied by variation of rate of air flow incurred by the ventilating devices and by variation of supply-pipe temperature, i.e. the temperature of the fluid in the heating or cooling fluid. A central valve for varying the flow rate in the pipe may be provided. One or more thermostats may be provided in the rooms, e.g. one thermostat in each room. The control system may, in accordance with a signal from each of the thermostats, vary the air flow rate of the ventilating devices, the central valve and/or the supply-pipe temperature. No separate feeding and/or outflow pipe systems for the individual rooms are needed, thereby facilitating the installation of the heating and/or cooling system of a building and reducing the costs involved in erecting the building. One or more of the ventilating devices may be ventilating devices according to the first and second aspect of the invention, in which case the rate of air flow may be varied by varying the rotational speed of the impeller or impellers. More than one pipe may be provided, such as two pipes or more. The above advantages, characteristics and features also apply to the system and the method mentioned below.

The invention also relates to a system for varying the temperature in at least two rooms of a building comprising a heating or cooling pipe extending between said rooms, said system comprising:
  a plurality of ventilating devices, each ventilating device being adapted to be arranged in each room in the vicinity of said pipe, the ventilating device being further adapted to cause a flow of air across the pipe,
  a control system for controlling operation of each of the ventilating devices, so as to vary the rate of heat transfer from the pipe to its surroundings by variation of the air flow rate of said air flow.

Further, the invention relates to a method for controlling the rate of heat transfer from a cooling or heating pipe in a building comprising at least two rooms, the heating or cooling pipe extending from a first one of the rooms to a second one of the rooms, a ventilating device being arranged in each room in the vicinity of said pipe, the method comprising the steps of:
  operating the ventilating device so as to cause a flow of air across the pipe,
  operating the ventilating device so as to vary the air flow rate of said air flow and thereby the rate of heat transfer from the pipe.

BRIEF DESCRIPTION OF THE DRAWINGS

FIG. 3 shows the ventilating device of FIGS. 1 and 2 in an open fashion with the cover pivoted away from the pipes to another side, FIG. 4 shows an exploded view of a bearing arrangement for the impeller.

DESCRIPTION OF THE DRAWINGS

Figure 1:
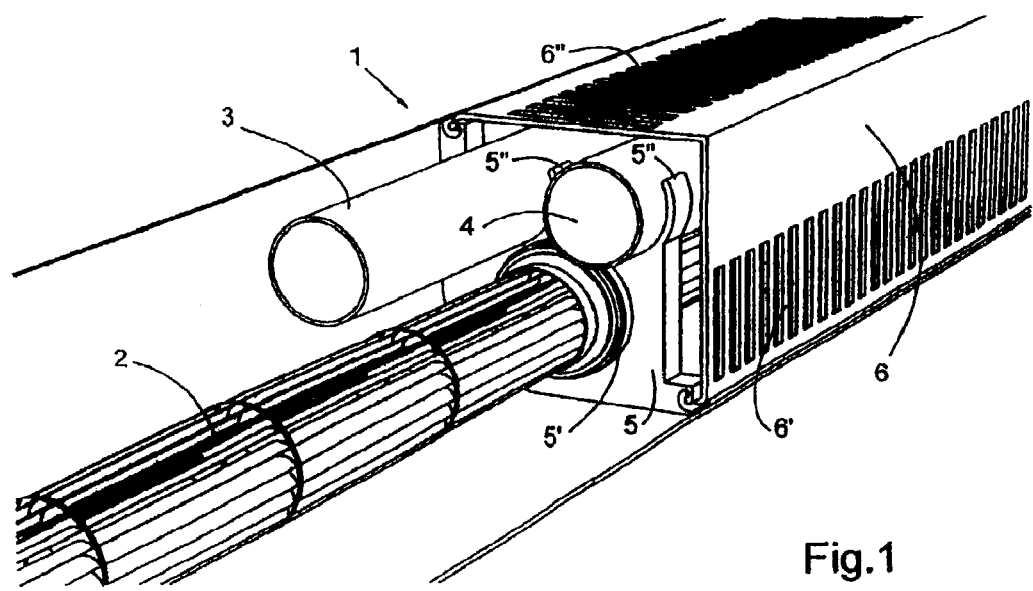
FIG. 1 shows a partly cut up illustration of a part of a ventilating device according to the invention.
Figure 2:
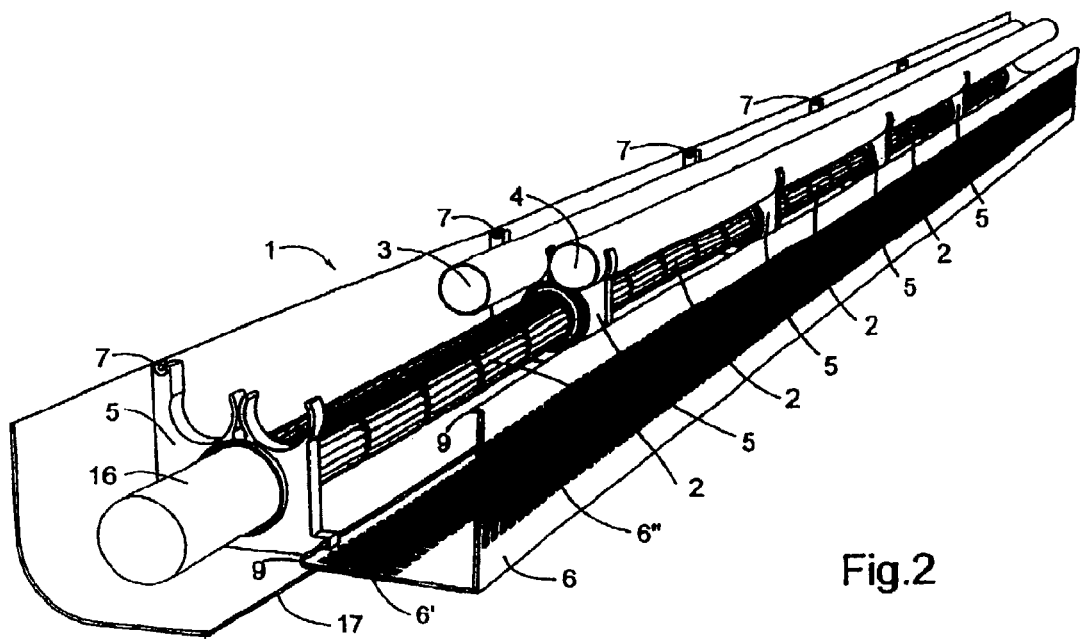
FIG. 2 shows the ventilating device of FIG. 1 in an open fashion with the cover pivoted away from the pipes to one side.
Figure 9:
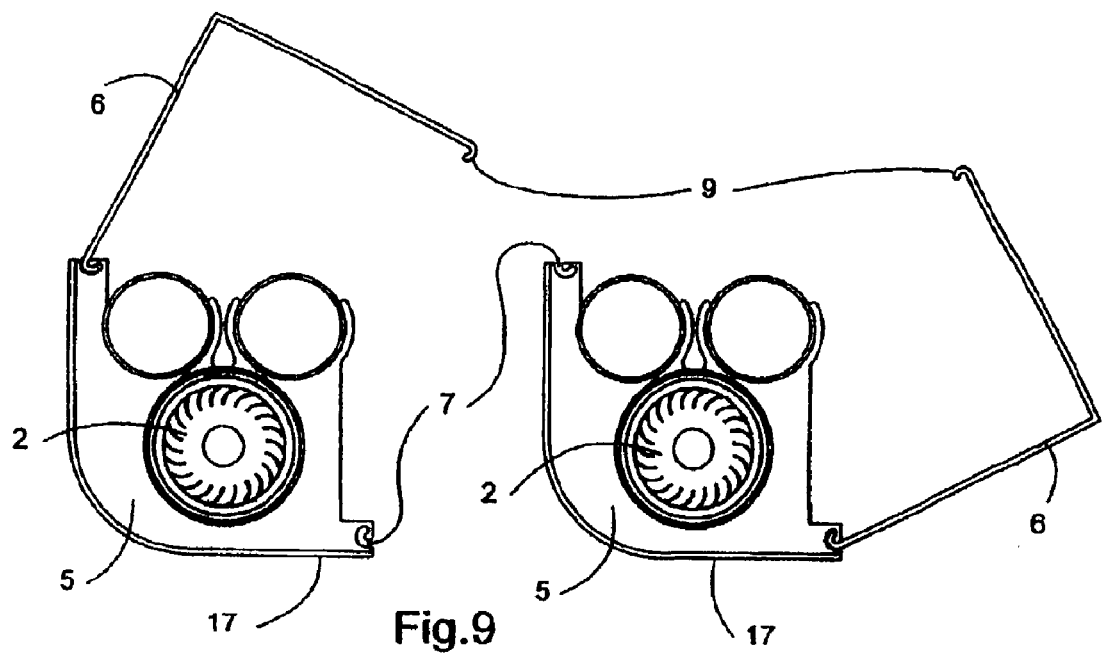

All embodiments described hereafter are embodiments of a ventilating device according to both the first and the second aspect of the invention. FIG. 1 shows a partly cut up illustration of a part of a ventilating device 1 having an impeller 2 and being mounted to a supply pipe 3 for a heating or cooling fluid and a return pipe 4 for the fluid. The ventilating device comprises a holding member 5 for holding the impeller 2 and the pipes 3 and 4 in fixed positions in relation to each other. The holding member 5 comprises a through-going bore 5' for receiving and holding two impellers 2 and their associated bearings. Clips 5" are provided for holding the pipes 3 and 4. A cover 6 with two sets of louvers 6' and 6", respectively is provided. FIG. 2 shows the ventilating device of FIG. 1 with the cover pivoted away from the pipes. The cover comprises bends or hooks 9 for engaging with corresponding grooves 7 on the holding member 5. The bends or hooks 9 and the corresponding grooves 7 are adapted to serve both as fixing means and hinges. The holding members 5 may be mounted to a wall, floor or chassis 17. As illustrated by FIGS. 2, 3 and 9, the cover is pivotal in two ways, allowing for access to the pipes and impellers from two sides.

Figure 5:
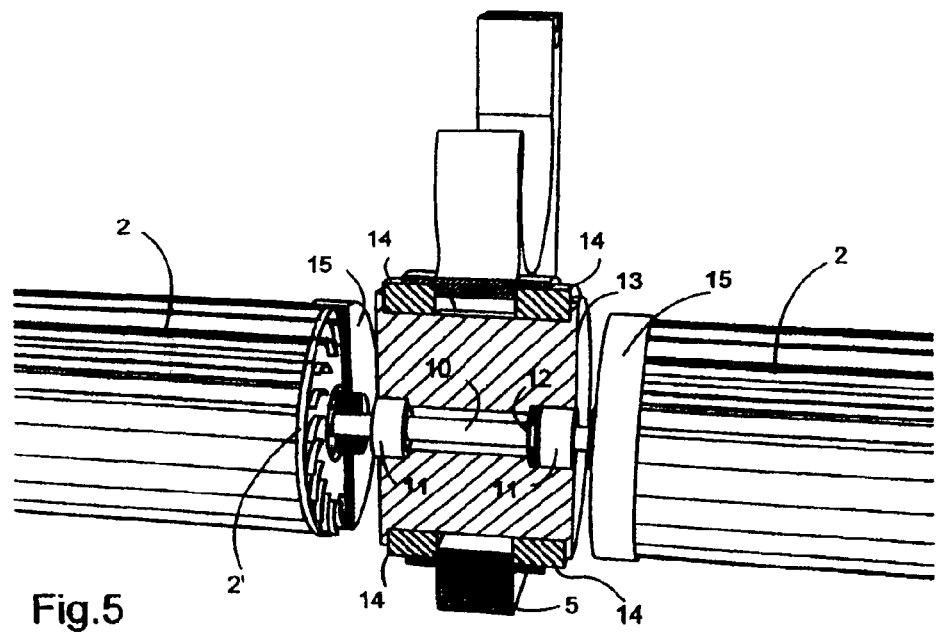
FIG. 5 shows a cross-sectional view of the bearing arrangement of FIG. 4.

FIGS. 4 and 5 show the bearing arrangement for the impeller. The bearing arrangement comprises two ball bearings 11 fitted onto a shaft 10 coextending with the rotational axis of the impellers 2. A recess or cut-out is provided at each end of the bearing block 13 for receiving the ball bearings 11. A spring 12 is provided for preloading of ball bearings 11, so as to eliminate noise that would otherwise be generated by the bearings. The ball bearings 11 are firmly fitted onto the shaft 10, and at least the ball bearing next to the spring 12 is loosely fitted into the bearing block 13. The spring 12 exerts a force onto an outer ring of one of the ball bearings 11, so as to exert a force on the shaft 10 and thereby on an inner ring of the other ball bearing.

Two rubber rings 14 are provided, one on each side of the holding member 5, so as to fix the bearing block 13 in relation to the holding member 5 and to dampen vibrations. In order to hold the impellers 2 in position in relation to the shaft 10 and in order to transmit motion between the impellers 2 and the shaft 10, a resilient collar member or clutch 15 is provided, the clutch 15 having a central through-going or blind hole 15', through which the shaft 10 extends, and a collar portion 15" fitting tightly around an annular driving member 2' of the impeller 2. The collar member or clutch 15 together with the shaft 10 serves to transmit rotation from one impeller to another, and also allows for the impellers to be easily removed, e.g., for cleaning purposes.

Figure 6:
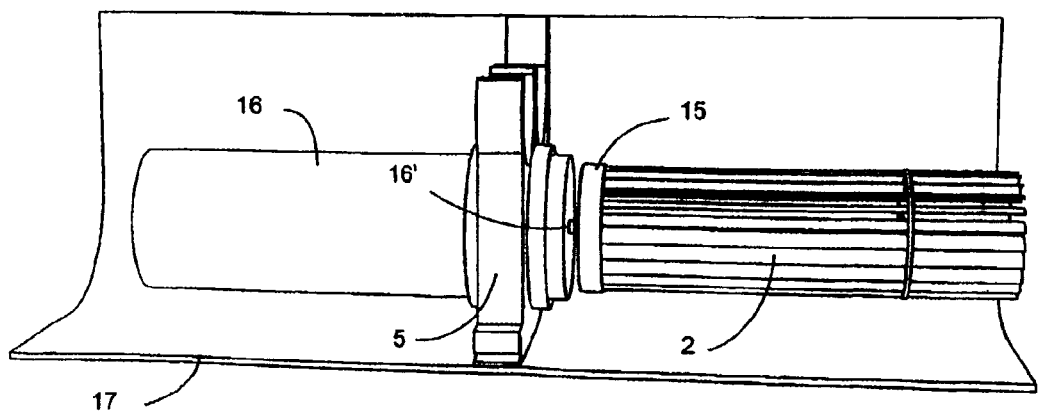
FIG. 6 illustrates the mounting of a motor in relation to a holding member and an impeller.

The impellers 2 are driven by a motor 16, as illustrated in FIG. 6. The mother 16 has an output shaft 16' connected to an annular driving member 2' of the impeller 2 in the same manner as described above in connection with FIG. 5.

Figure 7:
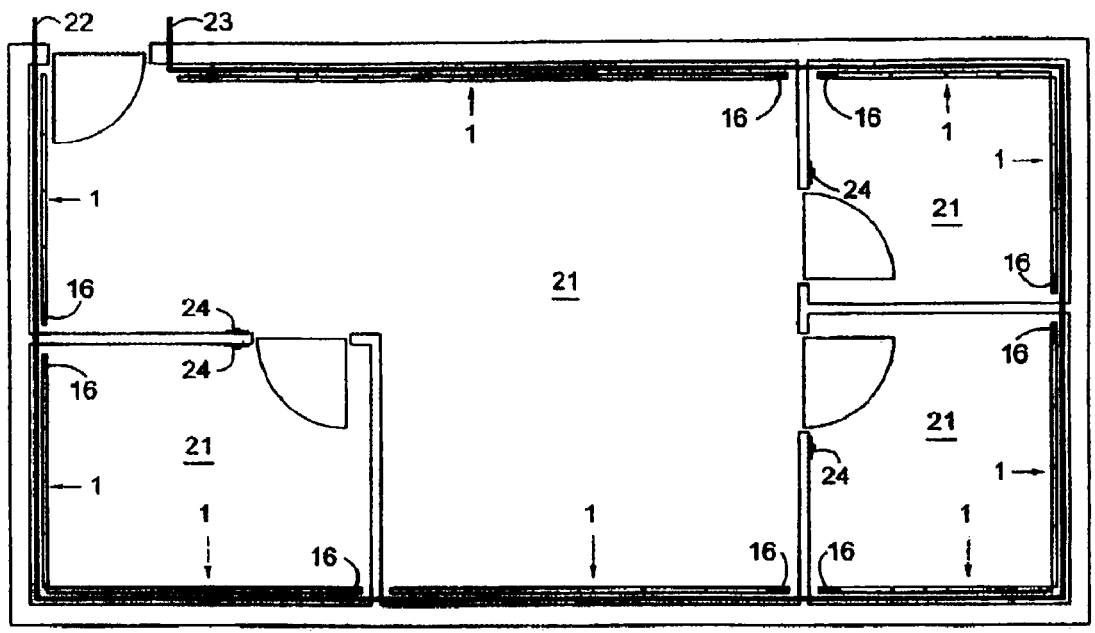
FIG. 7 is a sketch illustrating a floor of a building according to the invention.

FIG. 7 is a sketch illustrating a floor 20 of a building according to the invention. The floor comprises a plurality of rooms 21 with a plurality of ventilating devices 1 according to the invention in each room. A supply pipe with hot water or steam enters the floor at 22 and exits the floor at 23. In each room, the motor 16 of a ventilating devices 1 is connected to a thermostat 24 controlling the rate of movement of the motor and thereby the rate of heat exchanged by the ventilating device in the room.

Figure 8:
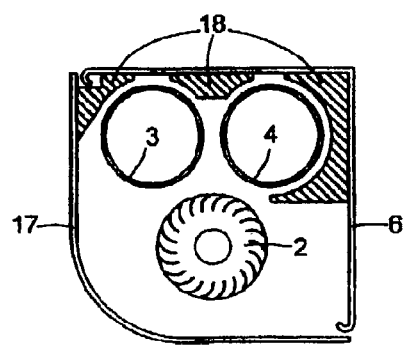
FIG. 8 is a cross-sectional illustration of a ventilating device according to the invention, FIG. 9 comprises two cross-sectional illustrations of a ventilating device according to the invention.

FIG. 8 is a cross-sectional illustration of a ventilating device according to the invention with guide members 18 for guiding the air emerging from the impeller 2 around the pipes 3 and 4. Preferably, the guides are adapted so as to cause 40–60% of the air through the opening above the supply pipe 3, and the rest of the air through the opening above the supply pipe 4.

FIG. 9 comprises two cross-sectional illustrations of a ventilating device, illustrating pivoting of the cover around the grooves 7 by means of the hooks 9. The two hinges thus provided are identical, so that the cover may be opened to two sides. While serving as hinges, the grooves 7 and the hooks 9 also serve as locks for securing the cover in a fixed position in relation to the holding members.

Figure 10:
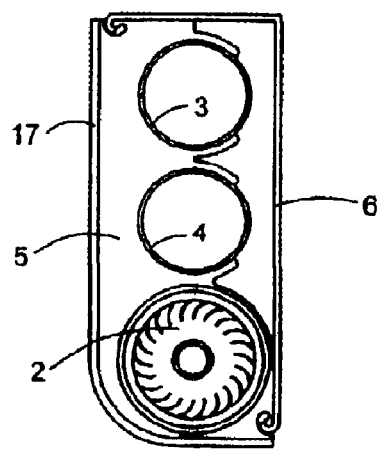
FIG. 10 is a cross-sectional illustration of a second embodiment of a ventilating device.
Figure 11:
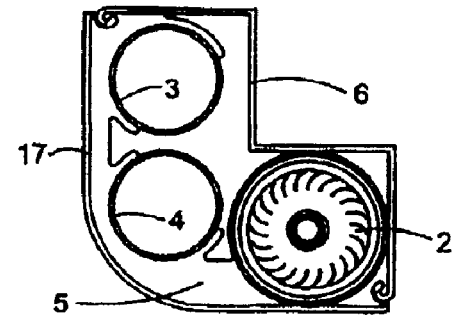
FIG. 11 is a cross-sectional illustration of a third embodiment of a ventilating device.
Figure 12:
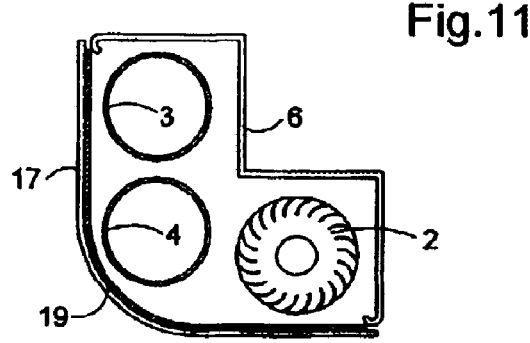
FIG. 12 is a cross-sectional illustration of the device of FIG. 11 with an absorption layer.

FIG. 10 shows a cross-sectional illustration of a second embodiment of a ventilating device with the impeller 2 and the pipes 3 and 4 arranged above one another, and the holding member 5 having a corresponding shape. FIG. 11 shows a cross-sectional illustration of a third embodiment with the pipes 3 and 4 arranged above one another and the impeller 2 arranged next to the pipe 4 in a sideways direction. FIG. 12 is a cross-sectional illustration of the device of FIG. 11 with an absorption layer 19 for absorbing, e.g., condense water in case the ventilating device as used for cooling.

Figure 13:
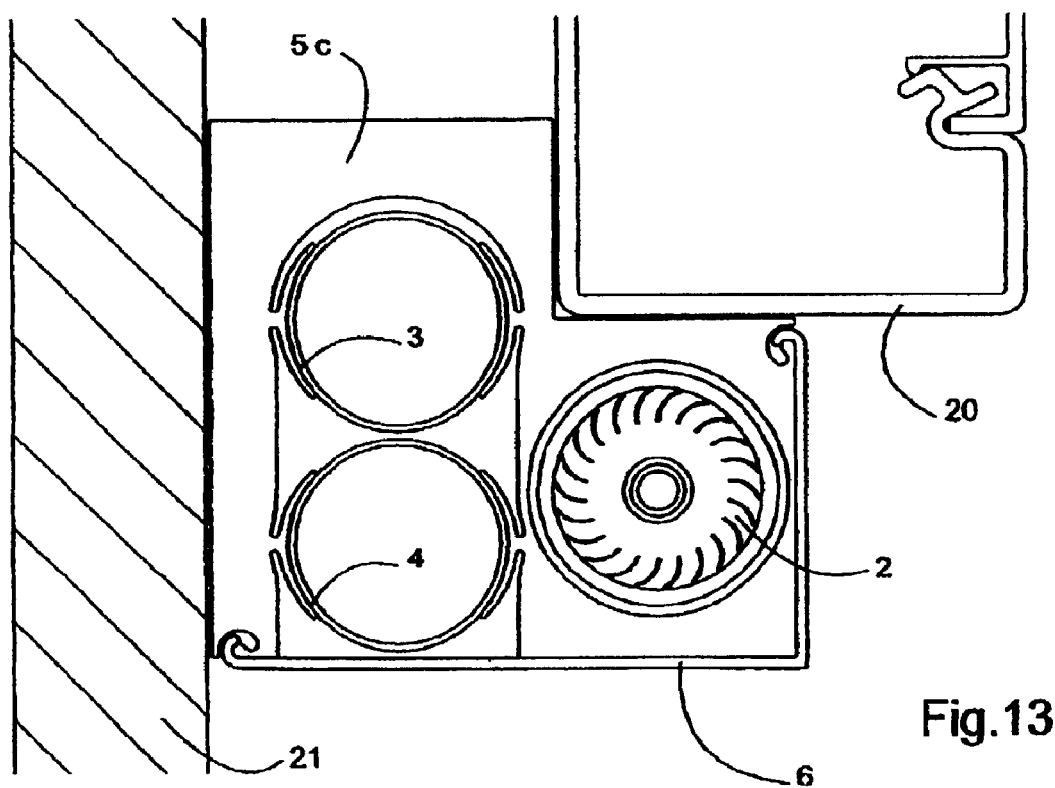
FIG. 13 is a cross-sectional illustration of a fourth embodiment of a ventilating device incorporating a holding member according to the invention.
Figure 14:
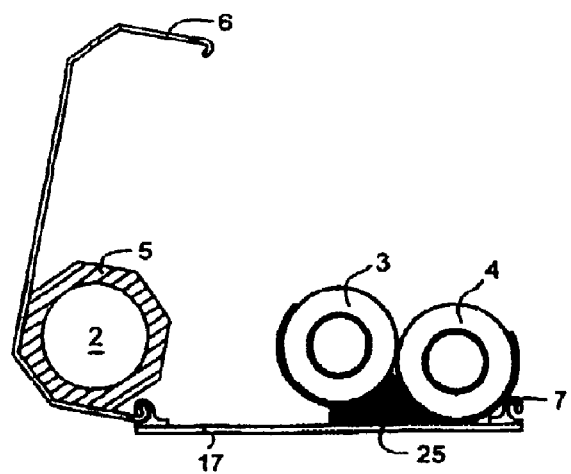
FIG. 14 is an illustration of a fifth embodiment of a ventilating device according to the invention.

FIG. 13 is a cross-sectional illustration of a fourth embodiment of a ventilating device incorporating a holding member 5c according to the invention. The device comprises a holding member 5c and is mounted between a wall 21 and a cable trunking 20 extending along the wall. The cable trunking 20 is adapted to hold cables such as power cables and computer network cables. The supply pipe 3 and the return pipe 4 are arranged one above the other with the impeller 2 arranged at one side of the pipes. The pipes 3,4 and the impeller 2 are held by a holding member 5c which is adapted to hold the cover 6 in the same fashion as described in connection with the previous figures. In FIG. 13, the impeller 2 is adapted to suck air from the ambient atmosphere at the right-hand side of the figure and to blow air past the pipes 3 and 4, the air emerging from the ventilating device in an upward direction in FIG. 13. The holding member 5c may be mounted to the cable trunking 20 by means of screws or it may be mounted to a chassis for holding the cable trunking 20. A cover with louvers is preferably provided at the top of the ventilating device. The holding member 5c may be a mounting member according to the third aspect of the invention FIG. 14 is an illustration of a fifth embodiment of a ventilating device according to the invention, wherein the holding member 5 holding the impeller 2 is fixed to or integrated with the cover 6. A frame 25 is provided for holding the pipes 3 and 4. The frame 25 and the holding member are both held by a chassis or mounting plate 17 which may, e.g., be mounted to a window sill, a cable trunking in a mom of a building, or it may be mounted in an upright fashion at the joint of two walls of a building or at any location on a wall.

Figure 15:
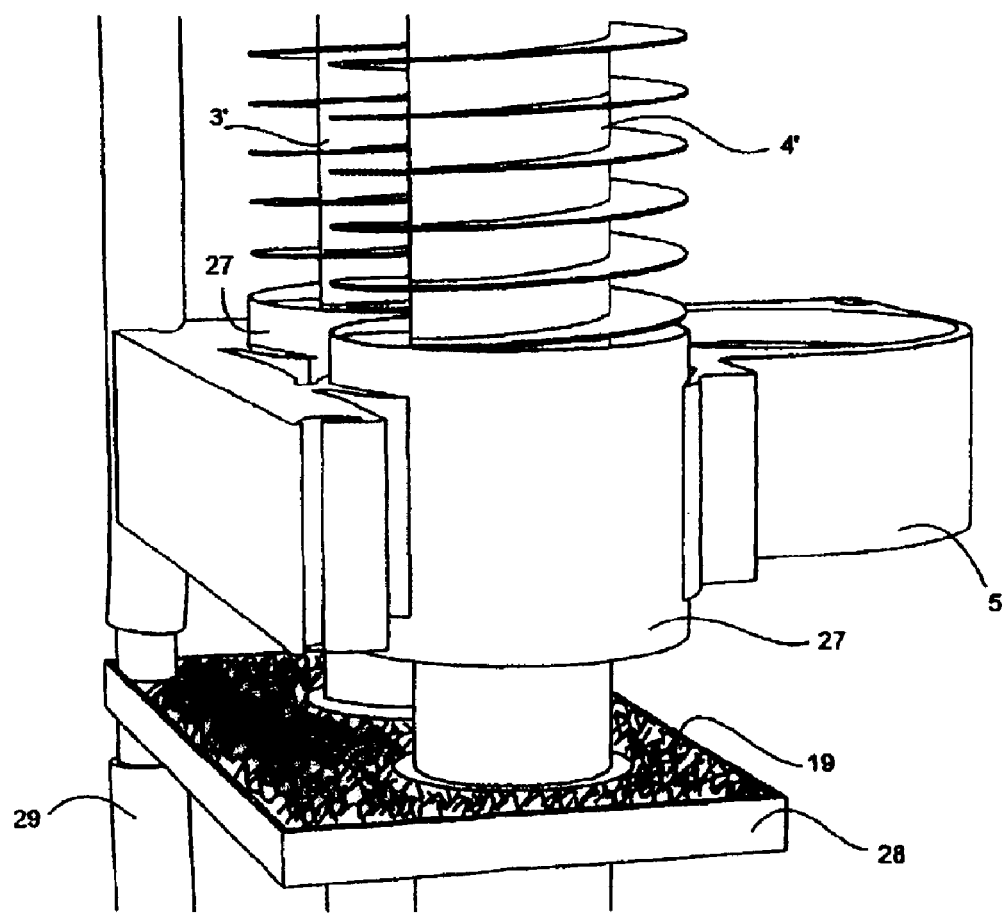
FIG. 15 is an illustration of a sixth embodiment of a ventilating device according to the invention.

FIG. 15 is an illustration of a sixth embodiment of a ventilating device according to the invention. The ventilating device is mounted to two finned pipes 3' and 4' which extend in an upright direction. The holding member 5 holds the finned pipes by an annular member 27 upon which the fins of the finned pipes rest. Alternatively, the annular member 27 may be squeezed around or otherwise secured to the finned pipes 3' and 4'. Preferably, the annular member 27 may be slidably mounted in the holding member, so as to allow for relative movement between the pipes 3' and 4' and the holding member 5 caused by thermal expansion. A drip tray 28 with an absorption pad 19 is provided. A draining pipe 29 is provided for leading away condense water from the drip tray 28. An underpressure may provided in the draining pipe 29, so as to suck condense water from the drip tray 28.

Figure 16:
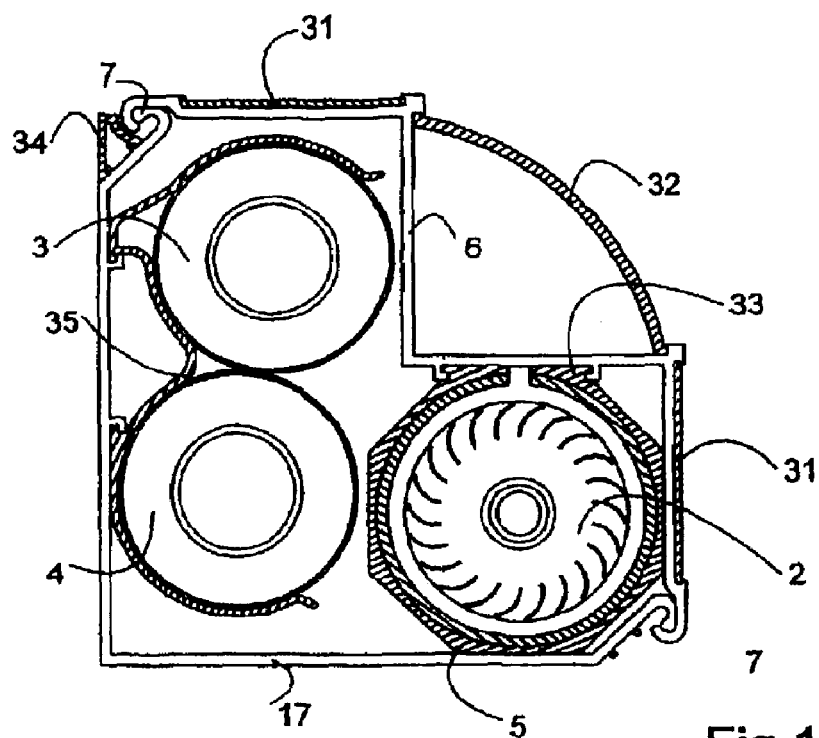
FIG. 16 is an illustration of a seventh embodiment of a ventilating device according to the invention.
Figure 17:
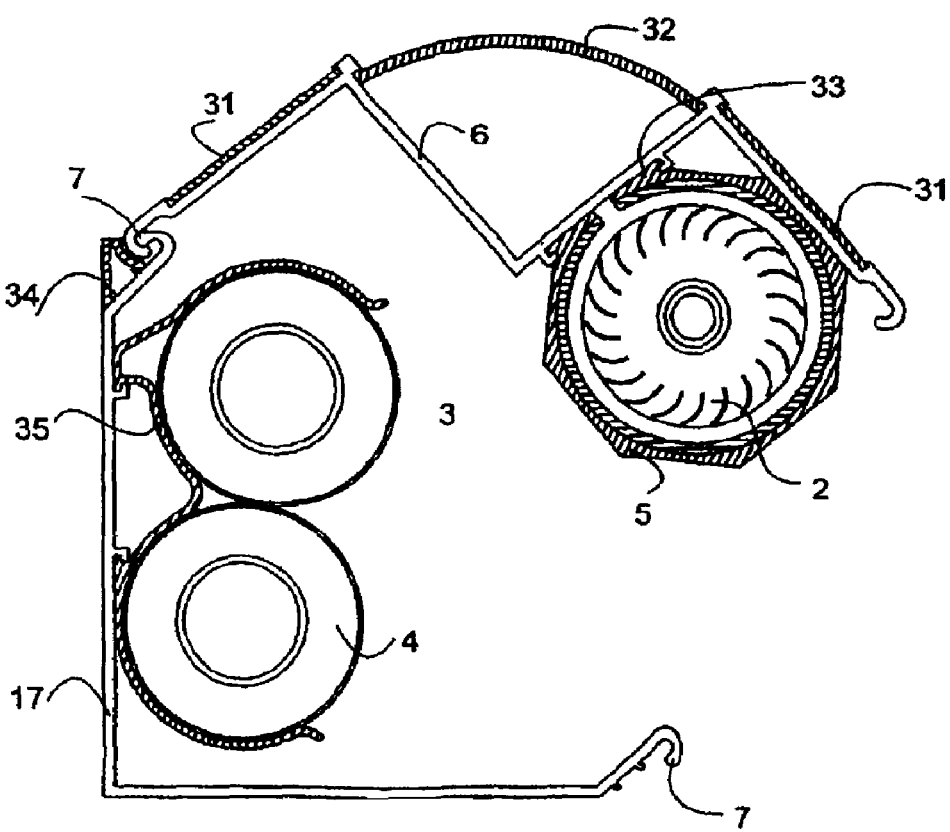
FIG. 17 illustrates the ventilating device of FIG. 16 with a cover thereof partly removed.

In the embodiment of FIG. 16, the ventilating device comprises a chassis or mounting plate 17 with eyes or grooves 7 by means of which the cover 6 is mounted to the chassis or mounting plate 17. Two perforated plates 31 are slideably received in the cover 6. Thus, small perforations of the two perforated plates 31 may be superimposed on large perforations in the cover 6 (not shown). Further, a decorative profile 32 and a bearing block clip 33 for supporting bearing blocks of the impeller or impellers 5 are slidably received in the cover 6. As shown in FIG. 17, at least one of the eyes or grooves 7 of the chassis 17 may serve as a pivot allowing the cover to be at least partly removed by rotation around the pivot. A pivot dip 34 is provided for supporting the pivot. The eyes or grooves 7 may extend along substantially the entire length of the device, whereas the a plurality of pivot clips 34 each having a length which is substantially shorter than the length of the ventilating device may be distributed over the length of the device. The pipes 3 and 4 are held by a pipe holding clip 35 which allows for mounting of the pipes 3 and 4 by clipping them into the pipe holding clip 35. The pipe holding clip 35 may be a mounting member according to the third aspect of the invention.

In all embodiments of the invention, the cover 6 and the chassis 17 may be made from aluminium by extrusion or from plastics. In case the cover 6 is extruded, the openings therein may be formed by punching.

What is claimed is:

1. A ventilating device comprising:
   at least two impellers extending in a longitudinal direction around an axis of rotation, each of the impellers being adapted to suck air from an ambient atmosphere in a transverse direction over a substantial part of the impeller's length,
   a motor connected to the impellers, so as to cause rotation of the impellers around said axis,
   at least one holding member at each end of each of the impellers for holding the impellers,
   a cover for covering the holding members and the impellers, and having openings formed therein, so as to allow a flow of air into and out of the impellers, the cover comprising a connector for connecting the cover to the holding members,
   wherein the holding members are adapted to cooperate with said connector of the cover, so as to connect the cover to the holding members.

2. A ventilating device according to claim 1, wherein the holding member is adapted to releasably connect the cover to the holding member.

3. A ventilating device according to claim 1, wherein the holding member is secured to the cover.

4. A ventilating device according to claim 1, wherein a plurality of impellers are mounted in a series, and wherein the motor is arranged at one end of the series, the impellers being mutually interconnected by a coupling.

5. A ventilating device according to claim 1, wherein a plurality of impellers are mounted in a series, and wherein the motor is arranged between two of the impellers in the series.

6. A ventilating device according to claim 1, wherein each of the holding members comprises a bearing for the impeller or impellers being held by the bearing.

7. A ventilating device according to claim 6, wherein the bearing comprises at least two ball, needle, sleeve or roller bearings, and a bearing block abutting the outer surface of the bearings, the bearing block being fitted into a bore or groove in the holding member.

8. A ventilating device according to claim 6, wherein the bearing is adapted to dampen vibrations of the impellers.

9. A ventilating device according to claim 6, wherein the bearing comprises a resilient ring fitted between the bearing block and a bore or groove in the holding member.

10. A ventilating device according to claim 6, wherein the bearing is adapted to dampen vibrations of the impellers.

11. A ventilating device according to claim 9, further comprising a collar member having a collar portion into which an end portion of an impeller is fitted, the collar member being mounted on one end of a shaft extending through the bearing, a further collar member being optionally provided at the other end of the shaft, which further collar member is in engagement with a further impeller, so as to transmit rotation from one impeller to another.

12. A ventilating device according to claim 10, further comprising a collar member having a collar portion into which an end portion of an impeller is fitted, the collar member being mounted on one end of a shaft extending through the bearing, a further collar member being optionally provided at the other end of the shaft, which further collar member is in engagement with a further impeller, so as to transmit rotation from one impeller to another.

13. A ventilating device according to claim 11, wherein the material from which the resilient ring is made is softer than the material from which the collar member is made.

14. A ventilating device according to claim 12, wherein the material from which the resilient ring is made is softer than the material from which the collar member is made.

15. A ventilating device according to claim 1, further comprising a thermostat for metering the ambient temperature and for controlling the speed of rotation of the impellers in response to the ambient temperature.

16. A ventilating device according to claim 1, and being adapted to be mounted to a pipe containing a heating or a cooling fluid and to hold the impellers and the pipe in fixed positions in relation to each other, the impellers and the cover being adapted to cause a substantial part of the flow of air emerging from the impellers to flow in a transverse direction along the outer surface of the pipe and back to the ambient atmosphere.

17. A ventilating device according to claim 16, wherein the holding member is adapted to be mounted to the pipe and to hold the impellers and the pipe in fixed positions in relation to each other.

18. A ventilating device according to claim 16, wherein said pipe constitutes a supply pipe for the fluid, the ventilating device further comprising a return pipe for the fluid.

19. A ventilating device according to claim 18, wherein the holding member is adapted to hold the return pipe in a fixed position in relation to the impellers and the supply pipe.

20. A ventilating device according to claim 16, wherein the pipe comprises a finned pipe.

21. A ventilating device according to claim 16, wherein the fluid in the pipe is at a higher temperature than the ambient air.

22. A ventilating device according to claim 16, wherein the fluid in the pipe is at a lower temperature than the ambient air.

23. A ventilating device according to claim 22, wherein an absorption layer is provided for absorbing condense water.

24. A ventilating device according to claim 23, wherein the absorption layer is provided in a drip tray comprised in the device.

25. A ventilating device according to claim 22, further comprising a draining pipe for leading away condense water and at least one opening for letting condense water into the pipe.

26. A ventilating device according to claim 25, wherein the pressure in the draining pipe is lower than ambient pressure, so as to allow condense water to be led away by suction.

27. A ventilating device according to claim 25, wherein said at least one opening comprises a longitudinally extending slot at the top part of the draining pipe, 28. A ventilating device according to claim 25, wherein the draining pipe is mounted to or held by the holding member.

29. A ventilating device according to claim 25, wherein the draining pipe is mounted to or an integrated part of the cover or of a chassis.

30. A ventilating device according to claim 16, wherein the cover comprises a guide adapted to cause the flow of air emerging from the impellers to flow along the outer surface of the pipe.

31. A ventilating device according to claim 30, wherein the guide is coated with or made from a heat insulating material.

32. A ventilating device comprising:
at least two impellers extending in a longitudinal direction around an axis of rotation, each of the impellers being adapted to suck air from an ambient atmosphere in a transverse direction over a substantial part of the impeller's length,
a motor connected to the impellers, so as to cause rotation of the impellers around said axis,
at least one coupling for transmitting a driving force of the motor from said first impeller to a further one of the impellers,
the ventilating device being adapted to be mounted to a heating or cooling pipe, the impellers being adapted to cause a substantial part of the flow emerging from the impellers to flow in a transverse direction along the outer surface of the pipe and back to the ambient atmosphere.

33. A ventilating device according to claim 32, further comprising at least one holding member at each end of the impellers for holding the impellers.

34. A ventilating device according to claim 33, further comprising a cover for covering the holding members and the impellers, the cover having openings formed therein, so as to allow a flow of air into and out of the impellers.

35. A ventilating device according to claim 34, wherein the cover has a connector for connecting the cover to the holding member, and wherein the holding member is adapted to cooperate with the connector, so as to connect the cover to the holding member.

36. A ventilating device according to claim 33, wherein the holding member is adapted to releasably connect the cover to the holding member.

37. A ventilating device according to claim 33, wherein the holding member is secured to the cover.

38. A ventilating device according to claim 32, wherein a plurality of impellers are mounted in a series, and wherein the motor is arranged between two of the impellers in the series.

39. A ventilating device according to claim 33, wherein each of the holding members comprises a bearing for the impeller or impellers being held by the bearing.

40. A ventilating device according to claim 39, wherein the bearing comprises at least two ball, needle, sleeve or roller bearings, and a bearing block abutting the outer surface of the bearings, the bearing block being fitted into a bore or groove in the holding member.

41. A ventilating device according to claim 39, wherein the bearing is adapted to dampen vibrations of the impellers.

42. A ventilating device according to claim 39, wherein the bearing comprises a resilient ring fitted between the bearing block and a bore or groove in the holding member.

43. A ventilating device according to claim 42, wherein the bearing is adapted to dampen vibrations of the impellers.

44. A ventilating device according to claim 39, wherein said coupling comprises a collar member having a collar portion into which an end portion of an impeller is fitted, the collar member being mounted on one end of a shaft extending through the bearing, a further collar member being optionally provided at the other end of the shaft, which further collar member is in engagement with a further impeller, so as to transmit rotation from one impeller to another.

45. A ventilating device according to claim 42, wherein said coupling comprises a resilient collar member having a collar portion into which an end portion of an impeller is fitted, and wherein the material from which the resilient ring is made is softer than the material from which the resilient collar member is made.

46. A ventilating device according to claim 32, further comprising a thermostat for metering the ambient temperature and for controlling the speed of rotation of the impellers in response to the ambient temperature.

47. A ventilating device according to claim 32 and being adapted to hold the impellers and the pipe in fixed positions in relation to each other.

48. A ventilating device according to claim 47, wherein the holding member is adapted to be mounted to the pipe and to hold the impellers and the pipe in fixed positions in relation to each other.

49. A ventilating device according to claim 47, wherein said pipe constitutes a supply pipe for the fluid, the ventilating device further comprising a return pipe for the fluid.

50. A ventilating device according to claim 49, wherein the holding member is adapted to hold the return pipe in a fixed position in relation to the impellers and the supply pipe.

51. A ventilating device according to claim 49, wherein the pipe or the return pipe comprises a finned pipe.

52. A ventilating device according to claim 49, wherein the fluid in the supply pipe is at a higher temperature than the ambient air.

53. A ventilating device according to claim 49, wherein the fluid in the supply pipe is at a lower temperature than the ambient air.

54. A ventilating device according to claim 53, wherein an absorption layer is provided for absorbing condense water.

55. A ventilating device according to claim 54, wherein the absorption layer is provided in a drip tray comprised in the device.

56. A ventilating device according to claim 53, further comprising a draining pipe for leading away condense water and at least one opening for letting condense water into the pipe.

57. A ventilating device according to claim 56, wherein the pressure in the draining pipe is lower than ambient pressure, so as to allow condense water to be led away by suction.

58. A ventilating device according to claim 56, wherein said at least one opening comprises a longitudinally extending slot at the top part of the draining pipe.

59. A ventilating device according to claim 56, wherein the draining pipe is mounted to or held by the holding member.

60. A ventilating device according to claim 56, wherein the draining pipe is mounted to or an integrated part of the cover or of a chassis.

61. A ventilating device according to claim 34, wherein the cover comprises a guide adapted to cause the flow of air emerging from the impellers to flow along the outer surface of the pipe.

62. A ventilating device according to claim 61, wherein the guide is coated with or made from a heat insulating material.

63. A ventilating device according to claim 16, further comprising a mounting member into which said pipe may be mounted by clipping.

64. A ventilating device according to claim 47, further comprising a mounting member into which said pipe may be mounted by clipping.

65. A building comprising at least one ventilating device according to claim 79 and a ventilating device comprising:
at least two impellers extending in a longitudinal direction around an axis of rotation, each of the impellers being adapted to suck air from an ambient atmosphere in a transverse direction over a substantial part of the impeller's length,
a motor connected to the impellers, so as to cause rotation of the impellers around said axis,
at least one coupling for transmitting a driving force of the motor from said first impeller to a further one of the impellers,
the ventilating device being adapted to be mounted to a heating or cooling pipe, the impellers being adapted to cause a substantial part of the flow emerging from the impellers to flow in a transverse direction along the outer surface of the pipe and back to the ambient temperature.

66. A building according to claim 65, further comprising a pipe containing a heating or a cooling fluid, said pipe extending between at least two rooms of the building.

67. A building according to claim 65, wherein a motor and a thermostat is provided in at least one room, the thermostat being adapted to control the speed of rotation of the associated motor, so as to control the temperature in the room.

68. A building according to claim 66, wherein the pipe extends between two rooms at the same level.

69. A building according to claim 65, wherein at least part of the pipe extends in an upright direction.

70. A building according to claim 69, wherein the pipe extends between rooms at different levels.

71. A building according to claim 65, wherein at least part of the pipe extends underground so as to confer heat exchange between the ground and the fluid in the pipe.

72. A building comprising at least one ventilating device according to claim 1.

73. A building according to claim 72, further comprising a pipe containing a heating or a cooling fluid, said pipe extending between at least two rooms of the building.

74. A building according to claim 72, wherein a motor and a thermostat is provided in at least one room, the thermostat being adapted to control the speed of rotation of the associated motor, so as to control the temperature in the room.

75. A building according to claim 73, wherein the pipe extends between two rooms at the same level.

76. A building according to claim 73, wherein at least part of the pipe extends in an upright direction.

77. A building according to claim 73, wherein the pipe extends between rooms at different levels.

78. A building comprising a ventilating device according to claim 32.

79. A building according to claim 78, further comprising a pipe containing a heating or a cooling fluid, said pipe extending between at least two rooms of the building.

80. A building according to claim 78, wherein a motor and a thermostat is provided in at least one room, the thermostat being adapted to control the speed of rotation of the associated motor, so as to control the temperature in the room.

81. A building according to claim 79, wherein the pipe extends between two rooms at the same level.

82. A building according to claim 79, wherein at least part of the pipe extends in an upright direction.

83. A building according to claim 82, wherein the pipe extends between rooms at different levels.

84. A building according to claim 79, wherein at least part of the pipe extends underground so as to confer heat exchange between the ground and the fluid in the pipe.

85. A method of operating a ventilating device according to claim 16, comprising counteracting heat transmission due to natural convection by operating the impellers in such a way as to achieve convection opposite to the natural convection.

86. A method of operating a ventilating device according to claim 32, comprising counteracting heat transmission due to natural convection by operating the impellers in such a way as to achieve convection opposite to the natural convection.

87. A mounting member for holding in a fixed position at least one pipe of a ventilating device through which flows heating or cooling fluid, the pipe extending in a longitudinal direction, the mounting member being adapted to fix the pipe in a transverse direction in relation to the mounting member and to releasably fix the pipe in relation to the mounting member, the mounting member having an open face through which the pipe can be inserted into the mounting member in the transverse direction by relative movement between the mounting member and the pipe.

88. A mounting member according to claim 87, wherein the mounting member is adapted to hold at least two pipes in a fixed position.

89. A mounting member according to claim 88, wherein the two pipes when mounted in the mounting member are arranged along a straight line extending in said transverse direction, the mounting member having an open face at one end of the straight line through which the pipes can be inserted into the mounting member.

90. A mounting member according to claim 87, the holding member being adapted to be brought into engagement with the pipe or pipes by clipping.

91. A mounting member according to claim 87, further being adapted to hold an impeller in fixed relation to the pipe or pipes, 92. A mounting member according to claim 91, wherein comprising a bore extending through the mounting member for holding the impeller.

93. A building comprising:
at least two rooms,
a heating or cooling pipe extending from a first one of the rooms to a second one of the rooms,
the ventilating device of claim 79 being arranged in each room in the vicinity of said pipe, the ventilating device being adapted to cause a flow of air across the pipe,
a control system for controlling operation of each of the ventilating devices, so as to vary the rate of heat transfer from the pipe to its surroundings by variation of the air flow rate of said air flow.

94. A system for varying the temperature in at least two rooms of a building comprising a heating or cooling pipe extending between said rooms, said system comprising:
a plurality of the ventilating devices as claimed in claim 1, each ventilating device being adapted to be arranged in each room in the vicinity of said pipe, the ventilating device being further adapted to cause a flow of air across the pipe,
a control system for controlling operation of each of the ventilating devices, so as to vary the rate of heat transfer from the pipe to its surroundings by variation of the air flow rate of said air flow.

95. A method for controlling the rate of heat transfer from a cooling or heating pipe in a building comprising at least two rooms, the heating or cooling pipe extending from a first one of the rooms to a second one of the rooms, a ventilating device as claimed in claim 1 being arranged in each room in the vicinity of said pipe, the method comprising the steps of:
operating the ventilating device so as to cause a flow of air across the pipe,
operating the ventilating device so as to vary the air flow rate of said air flow and thereby the rate of heat transfer from the pipe.

96. In a ventilating device comprising at least one longitudinally extending pipe through which flows cooling or heating fluid, a mounting member holding the at least one pipe, the mounting member fixing the at least one pipe in a transverse direction in relation to the mounting member and releasably fixing the at least one pipe in relation to the mounting member, the mounting member having an open face through which the pipe is inserted into the mounting member in the transverse direction by relative movement between the mounting member and the pipe.

* * * * *